United States Patent Office 3,393,252
Patented July 16, 1968

3,393,252
MELT BLEND OF POLYAMIDES
Joseph Zimmerman, Wilmington, Del., assignor to E. I.
du Pont de Nemours and Company, Wilmington, Del.,
a corporation of Delaware
Continuation-in-part of application Ser. No. 468,831,
July 1, 1965, which is a continuation-in-part of applications Ser. No. 38,123, June 23, 1960, Ser. No.
110,639, May 17, 1961, Ser. No. 199,375, June 1,
1962, and Ser. No. 339,579, Jan. 23, 1964. This
application Apr. 19, 1967, Ser. No. 632,064
5 Claims. (Cl. 260—857)

ABSTRACT OF THE DISCLOSURE

Fiber forming filaments having a molecular weight above 10,000 may be prepared from a blend of two polyamides, the first having a $T_g$ of less than 120° C. and a M.P. between 180° C. and 350° C., and the second having a $T_g$ greater than 140° C. and a M.P. of 180° C. to 350° C. The second polyamide constitutes 5 to 80% of the polymer blend and is exemplified by poly m-phenylene adipamide, polyhexamethylene isophthalamide, copolymers of hexamethylene isophthalamide and hexamethylene 5-t-butyl isophthalamide, and a polycarbonamide prepared from bis (4-aminocyclohexyl)-methane and dodecanedioic acid. The first polyamide is exemplified by polyhexamethylene adipamide, polycaproamide, polyhexamethylene sebacamide, and poly m-xylene adipamide.

Background of the invention

This application is a continuation-in-part of my copending application Ser. No. 468,831, filed July 1, 1965, which is in turn a continuation-in-part of application Ser. No. 199,375, filed June 1, 1962, and Ser. No. 339,579, filed Jan. 23, 1964, and Ser. No. 110,639, filed May 17, 1961, and Ser. No. 38,123, filed June 23, 1960, all now abandoned.

Although yarns made of polyamides such as polyhexamethylene adipamide and poly-ε-caproamide are produced for many textile and industrial end uses, their utility in other important end uses is restricted because of their limitations as to dimensional stability, modulus and growth. It is known, for example, that the latter properties contribute directly to the "flat-spotting" phenomenon which occurs when conventional polyamide yarns are fabricated into the tire reinforcement cords. This "flat-spotting" phenomenon is most frequently observed as a temporary tire vibration when a car equipped with nylon reinforced tires is used after being left in the garage overnight. The vibration or "axle bounce" is caused by a flat spot which develops at the point where the tread contacts the ground as the tire cools from the temperature reached in the previous drive. The depth of the flat spot produced is a function of tire operating temperature, as will be described more fully in connection with the illustrated graphs. High operating speeds produce high tire temperatures and large flat spots and therefore present the greatest problem; for example, tire temperatures of about 77° C. are developed at driving speeds of about 70 m.p.h. Under these conditions, polyhexamethylene adipamide (66 nylon) and poly-ε-caproamide (6 nylon) cords give flat spots of about 200 mils and 230 mils, respectively. For good performance when these speeds are required, the flat spot should be reduced to less than about 160 mils.

Similarly, the tires on a car standing for long periods of time at room temperature, e.g., in a show room, or those on a car driven at low speeds will often develop a detectable flat spot. Reducing the "standard" flat spot of tires reinforced with nylon cords produced as described herein by 10 mils is sufficient to effect a noticeable improvement in flat spots developed by high driving speeds and to eliminate detectable flat spot disturbances developed by low driving speeds.

It is obvious that any improvement in flat-spotting performance must be achieved with the minimum loss in other characteristics such as the tenacity, elongation and fatigue life of filaments in the tire reinforcement cords.

Objects

An object of the present invention is to provide a melt blended polyamide yarn having good dimensional stability, high modulus and relatively low growth which, when fabricated into tire cords, results in substantially reduced flat-spotting when compared with 66 or 6 nylon.

Another object of the invention is to provide a process for the production of melt blended polyamides and of articles shaped therefrom.

These and other objects will become apparent in the course of the following specification and claims.

The invention

In accordance with the present invention a novel and useful filament is provided, which filament is formed from a melt blend of at least two distinct, non-isomorphous, linear, high molecular weight polycarbonamides, there being a relatively low order of amide interchange among the polycarbonamides in the blend and each of the polycarbonamides and the blend having a melting point between about 180° C. and 350° C., the first polycarbonamide (A) having a glass transition temperature ($T_g$) as defined hereinafter, of no more than about 120° C. and the second polycarbonamide (B) containing as an integral part of the polymer chain a sufficient number of groups from the class consisting of divalent aromatic and divalent cycloaliphatic to provide a polymer with a $T_g$ of at least about 140° C., the blend of polycarbonamides being of fiber-forming molecular weight and the B component constituting from about 5% to about 80% by weight of the polymer in the blend. Either or both of the A and B components may be a copolymer, mixture or blend. Such a melt blend is produced by mixing at least 5% (weight percentage, based on total polymer weight) of polyamide B with a complementary amount of A, heating and mixing to obtain a homogeneous melt blend, at a temperature at least 1° C. above the melting point of the blend but not above about 350° C. for the minimum period to provide homogeneity. The melt blend is then spun into filaments and drawn.

While applicant does not wish to be bound by any theory, it is believed that cords produced from the filaments of this invention owe their exceptional stability to the fact that yarn crystallinity can normally be developed to a much higher degree than is possible with random copolymers of the same components and composition.

It is well known that certain pairs of polymers are isomorphous (i.e., the polymer blend components cocrystallize from the melt to form a mixed crystal). Random copolymers prepared from the same components have the characteristics of isomorphous polymers (having a melting point vs. composition curve without a clear eutectic). Any tendency toward isomorphism is an additional factor which should be avoided in selecting suitable pairs of A, B polyamides. In many cases, this can be predicted from the dimensions of the unit cell, as determined by X-ray measurements. A convenient estimate of this tendency may be derived from a comparison of the number of chain atoms in the repeating unit of each blend component. When these are the same, the chosen polymers will probably co-crystallize and be less desirable for purposes of this invention. Substituent groups may inhibit this co-crystallization. For A polymers of the 66 nylon type, which crystallize from the melt in the hexagonal system, then transform at a lower temperature (ca. 140° C.) to another system (i.e., triclinic), the A, B polymers must be non-isomorphous in the hexagonal system. A more sensitive criterion of suitable A, B combinations is found in the melting point-composition relation of random copolymers of A and B. When the melting points of these copolymers are appreciably less than that of either component, A and B are non-isomorphous and hence represent a preferred combination.

By a "relatively low order of amide interchange" is meant that reaction between the A and B components in the melt blend to form copolymers is maintained at a minimum by control of temperature and hold-up periods in the melt. Some copolymer formation, i.e., to form block copolymers, can be tolerated. While the amount of tolerable interchange will vary depending upon the identity of the B component, the proportion of the A to the B component present in the melt and the respective molecular weights of the components, in general, for high molecular weight polymers, amide interchange is controlled to not exceed about $$40 \frac{(\% \text{ by weight B})}{(\% \text{ by weight A})}$$

Preferably the interchange is controlled to be below about 10% as determined from a study of the rates of reaction of model compounds related to the polymers used in the blend (for a discussion of typical "model compounds" -C.F.- U.S. 3,063,966, to Kwolek et al. dated Nov. 13, 1962) as a function of temperature and holdup period. Knowing the reaction rate, the number of amide groups actually exchanged in the polymer blend can be calculated for any particular temperature and holdup period. Percent amide interchange is the ratio of polymer B amide groups actually exchanged to the total amide groups in the B polymer multiplied by 100. Due to amide interchange of the melting temperature, the melt blended polyamide of this invention is believed to be usually, at least in part, a block copolymer in which the segments of each polymer component are of relatively high molecular weight.

As a general rule, the first polyamide A of the blend is one which has good process operability, strength, toughness and, at the same time, is suitable for most end uses. The second polyamide B of the blend has aromatic or cycloaliphatic rings in its backbone in enough of its structural repeating units to provide a polymer which is structurally stiff (i.e., has a high $T_g$). This makes the B polymer more difficult to process as a homofiber because of its high melt viscosity. When a melt blend of A/B polymer contains at least about 5% of polyamide B, the "standard" tire flat spot is reduced by at least about 10 mils, compared to a similarly produced flat spot in an otherwise comparable tire reinforced with cords produced from polyamide A alone. High concentrations of B are generally even more effective in that they lead to acceptable flat spotting performance at higher tire operating temperatures. The preferred amount of B is $$(4S_A^2 + 24S_B^2 - 2, +8)$$

parts per 100 parts of the blend, where $S_A$ and $S_B$ are the set values, as defined hereinafter, for cords prepared from polyamides A and B, respectively. Where there is some tendency toward isomorphicity between A and B, larger amounts of polyamide B are required. The range of the numerical constants (−2, +8) in the preferred B concentration expression encompasses this variable. Thus, the quantity $4S_A^2 + 24S_B^2$ is decreased by as much as two when polyamides A, B are non-isomorphous and increased by as much as eight when there is a tendency toward isomorphicity. The maximum tolerable amount of polymer B is 80%; preferably, not over 50% B is employed.

When particular polyamides are melt blended according to the process conditions specified hereinafter and fabricated into tire cords, the latter have a set S of less than 1.0% which corresponds to a predicted flat spot depth of less than 160 mils when the cord moisture content is less than about 1.0%. In addition, significant improvements in the other properties of the yarn and cord are achieved.

The filaments of this invention are incorporated into tires using conventional tire building techniques. For example, conventionally twisted cords from filaments of the blend of 66 and 6I (Example II) are given an adhesive dip and stretched 6 to 20% for 10 to 120 seconds at 220 to 150° C. For best results, low humidity conditions should be maintained in the tire-building area. Conventional tire construction is employed (e.g., 38° cord angle), using dry rubber stock. A very suitable cure is achieved by heating the tire in a press at 139–147° C. for twenty minutes. The partially cured tire is then inflated to 48 lbs. and placed in an oven at 139–159° C. for 45 minutes. This "split" cure is especially effective in preventing shrinkage of the cords within the tire and provides for maximum retention of the improved flat-spotting characteristic of the filaments of this invention.

The drawing

The drawing, referred to specifically in Example II is a graph wherein the predicted tire flat spot depth in mils is plotted as ordinate versus temperature in degrees centigrade as abscissa.

Definitions and standards

The temperature (above 0° C.) at which maximum mechanical work loss occurs is referred to herein as $T_g$, a polymer property related to molecular mobility, possibly due to changes in freedom of chain rotation about C—C bonds. The manner in which this temperature is related to maximum mechanical work loss is given in "Die Physik der Hochpolmeren," A. S. Staverman and F. Schwarzl, Band IV, Springer-Verlag, Berlin, 1956, Chapter I. Measurements are made on the dry fiber at 0.1 cycles per second, with a strain amplitude of ±0.8%. The maximum value of tangent delta of the publication corresponds to the $T_g$ of the present specification. As employed herein it represents a temperature widely recognized in the polymer art and commonly referred to as the "glass transition temperature." Physically, this is the temperature at which the amorphous domains of a polymer change from a glassy or brittle condition to a liquid or rubbery one. More generally, it is at this temperature that the viscous mechanism of deformation is most apparent, e.g., at this temperature, there is a change in the slope of the curve relating elastic modulus and temperature and also a change in the slope of the curve relating expansion coefficient to temperature. It has been recognized in the field (Flory, "Principles of Polymer Chemistry," Cornell University Press, Ithaca, N.Y., 1953, p. 53, and Tobolsky, "Properties and Structure of Polymers," John Wiley and Sons, Inc., New York, 1960, pp. 69–70) that the numerical value obtained for $T_g$ in any case is highly dependent upon the method of determination. The values reported herein are determined by measuring the temperature at which maximum work loss occurs when a filament is cyclically stressed.

Representative $T_g$ values for polyamides disclosed herein for illustrative purposes are as follows:

| Polyamide | $T_g$ ° C. |
|---|---|
| Polyhexamethylene adipamide | 80 |
| Polycaproamide | 75 |
| Polymetaxylylene adipamide | 115 |
| Poly - 2 - methyl hexamethylene terephthalamide | 146 |
| Poly - 2,4/4,6 - dimethylmetaphenylene sebacamide | 180 |
| Polydimethylmetaphenylene suberamide | 180 |
| Polyamide prepared from bis(4-aminocyclohexyl)-methane (solid isomer mixture) and azelaic acid | 175 |
| Polymetaphenylene adipamide | 160 |
| Polyhexamethylene isophthalamide | 142 |
| Polyhexamethylene 5-t-butyl-isophthalamide | 160 |

The "set" or "S" of a cord as referred to herein is a measure of a viscoelastic property which can be related to a tire flat spot and which is obtained in a test which simulates conditions existing in a tire when a flat spot develops. In this test, changes in the length of two initially identical cords are measured as differential stresses and/or temperatures are applied. The differential stresses and temperatures simulate changes in the deflected and non-deflected portions of a tire. The algebraic difference between the changes in length is the set value and is expressed as a percentage. In determining the set value, a yarn sample is made up into an 840 denier drawn yarn which is then twisted 12 t.p.i. Z twist. Two ends are plied and twisted 12 t.p.i. S twist. The plied cord is hot stretched at a temperature 30° C. or more below the melting point of the yarn, at a tension of 2–4 pounds, for a period of 60 seconds. A machine which is adapted for measuring the changes in length in a filament or cord as the stresses and/or temperatures are varied is used for measuring the "set." In the test, it is important to maintain the cords at a low relative humidity (<10% relative humidity) and at a cord moisture content of less than 1.0%.

The detailed procedure for measuring the "set" developed by a cord when subjected to a particular cycle of temperatures and stresses is:

(1) relax cord at 160° C. for 10 minutes (simulates tire curing);
(2) mount two cords in the testing device; apply load of 0.8 g.p.d. and hold at 77° C. for 1 hour (this preconditions the cord);
(3) bring cord temperature to 25° C. and maintains at 0.6 g.p.d. for at least 30 minutes;
(4) measure positions of both cords ($L_a$ and $L_b$); this is the base point for both cords;
(5) change load to 0.8 g.p.d., bring cord to 77° C. and hold for 30 minutes;
(6) change load on cord $b$ to 0.25 g.p.d.;
(7) after 15 minutes bring cords to a temperature of 25° C.;
(8) after 5 minutes change load on cord $a$ to 0.6 g.p.d.;
(9) after 30 minutes measure position of cord $a$;
(10) immediately afterwards, change load on cord $b$ to 0.6 g.p.d. and measure position at exactly 1 minute ($L_b$, 1 min.);
(11) calculate $\Delta L_a$ in percent and $\Delta L_b$ in percent by comparing initial and final lengths; the algebraic difference between $\Delta L_a$ and $\Delta L_b$ is the set in percent.

Flat spot depth (the maximum radial distance in mils between the normal periphery of a tire and the geometric chord presented by a flat spot, produced under "standard" conditions described hereinafter) can be predicted from the set value in the following equation (for a 4-ply tire):

Predicted flat spot depth = 85S + 69.

The predicted flat spot (PFS) calculated from the set value determined by the test procedure just described predicts the flat spot of tires cured under conditions most likely to enhance flat spotting. When tires are cured under optimum conditions ("fast cure"), followed by post inflation, lower flat spots are observed. The depth of such flat spots may be predicted from the cord set value obtained by omitting the relaxation step (step 1, recited above) and testing the cord in the hot stretch condition. When results are reported which omit cord relaxation step 1, they are identified.

The PFS test predicts flat spots for a "standard" 4-ply tire, as described hereinafter. For 2-ply tires, the observed flat spot is 15 to 20 mils less than for 4-ply tires.

In the examples which follow, compositions are given in weight percent, unless otherwise indicated. Inherent viscosities are determined in a solution of 0.5 gm. polymer in 100 ml. m-cresol. Tire flat sports are laboratory produced by inflating 8.50 x 14, 4-ply tires (except where 2-ply tires are indicated as having been used) to 22 p.s.i.g., heating to 77° C., then loading to 1085 lbs. for two hours, i.e., until the tire has cooled. The radial deformation, in mils, is the flat spot depth. Where reference is made herein to "standard" flat spot values, the tires have been built under conditions of 20% R.H. or lower and tire cord moisture is less than 1% at the time of testing. The temperature to which the tire is heated before loading has been found to correlate with car operating speeds, as follows:

| | M.p.h. |
|---|---|
| 64° C. (147° F.) | 50 |
| 77° C. (171° F.) | 67 |
| 91° C. (195° F.) | 85 |
| 121° C. (250° F.) (approx.) | 125 |

The block melting points are determined by the method of Beaman and Cramer described in J. Polymer Sci., vol. 21, p. 223 (1956).

Tenacity, break elongation, initial modulus, relaxed cold growth and set are measured, and flat spot depth is predicted. The tensile properties are measured conventionally with an Instron Tester. Relaxed cold growth is determined from the measured elongation of a strand of known length on which a load of 1.0 g.p.d. has been suspended for 30 minutes. Cold growth includes not only the instantaneous (first ½ minute) elongation at the given load but also the elongation which occurs over the remainder of the 30 minute test period. Prior to testing, the samples are relaxed under no load for 48 hours at 55% relative humidity and 25° C. In each case, draw ratio, pin temperature and plate temperature are adjusted to give maximum tenacity with acceptable process operability (freedom from breaks).

Example 1

Flake of 66 nylon, i.e., polyhexamethylene adipamide, (A) with an inherent viscosity of 1.1 is mixed with flake of MPD-6 nylon, i.e., polymetaphenylene adipamide, (B) with an inherent viscosity of 0.46. The weight ratio between the mixed polyamides is 65/35 (A/B). After mechanical mixing, the flake is melted in a ½ inch screw extruder and fed to a spinneret. The temperature in the extruder increases in the direction of flow and, toward the extrusion end, the molten polymer has a temperature of 297° C. The holdup time, at 297° C., is 5 minutes. The blend is spun into a 5 filament 230 total denier bundle which is drawn at a ratio of 5.5 over a pin at 80° C. and a plate in tandem at 180° C. The yarn is observed to have a set value of 0.64% and a P.F.S. of 123 mils. The predicted flat spots in mils of yarns from each of A and B polymer is 210 and 104, respectively.

Blends of the same A and B polymers are made in various proportions and yarns are prepared from them. In addition a random A/B copolymer having an 80/20 component ratio is prepared (obtainable by holding the blend in the melt at high temperature for an extended period). The results obtained are reported in Table I.

TABLE I

| A/B Ratio | 70/30 | 75/25 | 80/20 | 90/10 | Random | 100/0 |
|---|---|---|---|---|---|---|
| Tenacity (grams/denier) | 8.7 | 7.0 | 7.1 | 7.6 | 3.1 | 8.5 |
| Elongation (percent) | 17 | 10 | 12 | 13 | 15 | 16 |
| Initial Modulus (grams/denier) | 100 | 70 | 75 | 68 | 46 | 49 |
| Relaxed Cold Growth, percent | 1.4 | 2.3 | 2.6 | 3.7 | 5.7 | 3.7 |
| Set, percent | 0.56 | 0.68 | 1.04 | 1.45 | 2.3 | |
| P.F.S. (mils) | 117 | 127 | 157 | 190 | 263 | |

Example 2

(a) Flake of 66 nylon, (A) having an inherent viscosity of 1.1 is mixed with flake of 6I nylon, i.e., polyhexamethylene isophthalamide (B) having an inherent viscosity of 0.45. The weight ratio between the mixed polyamides is 50/50. After mechanical mixing, the flake is melted in a press spinner. At the extrusion end, the molten polymer has a temperature of 300° C. Holdup time in the extruder/spinneret section is 15 minutes. The blend is spun into a 5 filament, 90 total denier bundle and drawn at a ratio of 5.0 over a pin at 80° C. and a tandem plate at 170° C. The yarn is observed to have a set of 0.89% and a P.F.S. of 145 mils. The P.F.S. in mils of the yarns from each of A and B polymer is 210 and 117, respectively.

Blends of the same A and B polymers are made in various proportions and yarns are prepared from them. In addition a random A/B copolymer having an 80/20 component ratio is prepared. The results obtained are reported in Table II.

TABLE II

| A/B Ratio | 50/50 | 60/40 | 70/30 | 80/20 | 90/10 | 95/5 | Random | 0/100 |
|---|---|---|---|---|---|---|---|---|
| Tenacity (grams/denier) | 5.5 | 5.4 | 8.2 | 9.1 | 9.5 | 8.2 | 3.8 | |
| Elongation, percent | 11 | 17 | 13 | 13 | 16 | 13 | 14 | |
| Initial Modulus (grams/denier) | 78 | 73 | 68 | 61 | 51 | 50 | 75 | |
| Relaxed Cold Growth, percent | | | 2.7 | 3.1 | 4.7 | 4.6 | 1.4 | |
| Set, percent | 0.93 | 0.86 | | | | | | |
| P.F.S. (mils) | 148 | 142 | 140 | [1] 128 | [1] 143 | 224 | | |

[1] Predicted flat spot from unrelaxed cord.

Figure 1:
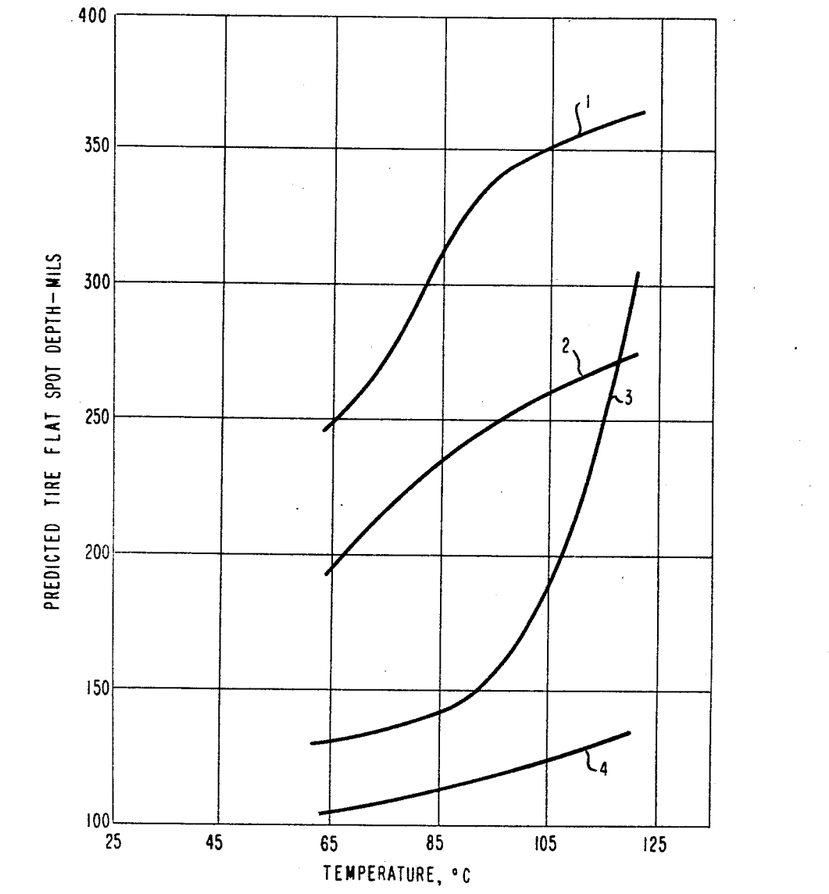

For purposes of comparison, the P.F.S. values over a range of temperatures are plotted in FIGURE I for cords formed from the 80/20 blend described above (curve 3), 66 nylon, (curve 1), 6 nylon (curve 2) and rayon (curve 4).

(b) Another polymer composition is prepared from 66 nylon (A) of 1.25 inherent viscosity and 6I nylon (B) of .81 inherent viscosity. The polymers are fed to separarate screw melters, blended to provide an A/B ratio of 80/20 at 295 to 320° C. in a homogenizer and extruded to form a 68 filament yarn. The yarn is drawn 6.05× at a pin temperature of 70° C. and over a hot pipe, having an input temperature of 180° C. and a delivery temperature of 210° C., to an average denier of 400. Using conventional procedures, except as noted, a two-ply cord is twisted, dipped, dried, hot stretched and built into an 8.50 x 14, four-ply tire, under low relative humidity conditions, using dry rubber stock. Hot stretching and tire curing are carried out as previously described. When given the standard flat-spotting test, a depth of 125 mils is observed. This value is even lower than the predicted level, due to the low moisture content of the cords in the tire during curing and at the time of testing.

Example 3

Flake of 66 nylon (A) with an inherent viscosity of 1.1 is mixed with flake of a 48/52 random copolymer of the 2,4 and 4,6 isomers of polydimethylmetaphenylene suberamide (B) with an inherent viscosity of 0.40. The ratio between weight of 66 nylon and polydimethylmetaphenyl suberamide is 70/30. After mechanical mixing, the flake is melted in a one-inch screw extruder and fed to a spinneret. The temperature at the extrusion end of the extruder is 300° C. and holdup time in the extruder/spinnert section is five minutes. The blend is spun into a 34 filament, 1210 total denier bundle which is drawn at a ratio of 5.5 over a pin at 120° C. and a tandem plate at 200° C. The test is repeated using a ratio of A/B of 80/20. The resulting filament and cord properties are reported in Table III.

TABLE III

| Ratio A/B | 70/30 | 80/30 |
|---|---|---|
| Tenacity (grams/denier) | 5.5 | 7.1 |
| Elongation, percent | 15 | 14 |
| Initial Modulus (grams/denier) | 85 | 84 |
| Relaxed Cold Growth, percent | 3.0 | 3.6 |
| Set, percent | 0.85 | 1.06 |
| P.F.S. (mils) | 141 | 154 |

Example 4

Flake of MxD-6, i.e., polymetaxylylene adipamide (A) with an inherent viscosity of 0.8 is mixed with flake of MPD-6 (B) with an inherent viscosity of 0.5. The weight ratio of A/B is 80/20. After mechanical mixing, the flake is melted in a ½ inch screw extruder and fed to a spinneret. The temperature at the extrusion end of the extruder is 302–310° C. the holdup time in the extruder/spinneret section is 5 minutes. The blend is spun into a 5 filament 200 total denier bundle which is drawn at a ratio of 5 over a pin at 80° C. and a tandem plate at 170° C. The resulting filament and cord properties, along with those observed from following the procedures of Examples 5–7 below, are reported in Table IV.

Example 5

Flake of 6–10 nylon, i.e., polyhexamethylene sebacamide (A) with an inherent viscosity of 1.1 is mixed with flake of MPD-6 (B) with an inherent viscosity of 0.6. The weight ratio of A/B is 75/25. After mechanical mixing, the flake is melted in a ½ inch screw extruder and from there is fed to a spinneret. The temperature at the extrusion end of the extruder is 305° C. The holdup time in the extruder/spinneret section is 5 minutes. The blend is spun into a 5 filament 160 total denier bundle which is drawn at a ratio of 5.3 over a pin at 80° C. and a tandem plate at 170° C.

Example 6

Flake of 66 nylon (A) with an inherent viscosity of 1.1 is mixed with flake of polytrimethylene isophthalamide (B) with an inherent viscosity of 0.6. The weight ratio of A/B is 80/20. After mechanical mixing, the flake is melted in a ½ inch screw extruder and fed to a spinneret. The temperature at the extrusion end of the extruder is 305–310° C. The holdup time in the extruder/spinneret section is 5 minutes. The blend is spun into a 5 filament 160 total denier bundle which is drawn at a ratio of 5.0 over a pin at 80° C. and a tandem plate at 170° C.

Example 7

Flake of 6 nylon (A) with an inherent viscosity of 1.0 is mixed with flake of MPD-6 (B) with an inherent viscosity of 0.6. The weight ratio between the mixed polyamides is 70/30. After mechanical mixing, the flake is melted in a ½ inch screw extruder and from there is fed to a spinneret. The temperature of the screw extruder increases in the direction of flow and at the extrusion end the molten polymer has a temperature of 275° C. The holdup time in the extruder/spinneret section is 5 minutes. The blend is spun into a 5 filament 304 denier bundle which is drawn at a ratio of 5.0 over a pin at 70° C. The set is 0.70% and the flat spot depth 136 mils, compared to 2.1% and 250 mils for a control yarn of polycaproamide.

TABLE IV

| Example No | 4 | 5 | 6 | 7 |
|---|---|---|---|---|
| Tenacity (grams/denier) | 3.3 | | 4.7 | |
| Elongation, percent | 26 | | 15 | |
| Initial Modulus (grams/denier) | 65 | | 51 | |
| Relaxed Cold Growth, percent | 3.1 | 2.2 | 2.0 | |
| Set, percent | 0.70 | 0.59 | 0.64 | 0.79 |
| P.F.S. (mils) | 128 | 119 | 123 | 136 |

Example 8

Filaments of various compositions are spun and drawn, under conditions substantially as disclosed in Eample 4. Concentration percentages and "set" values for the individual components are listed in the following table.

TABLE V

| Sample | Polymer A | | Polymer B | |
|---|---|---|---|---|
| | Amount, percent | Set, percent | Amount, percent | Set, percent |
| 8a | 65% 6 nylon, i.e. polycaproamide. | 2.1 | 35% 6I | 0.57 |
| 8b | 85% 66 | 1.7 | 15% polytetramethylene isophthalamide | |
| 8c | 70% MXD-6 | 1.0 | 30% 6I | 0.57 |
| 8d | 74% 66 | 1.7 | 26% 6I/66 [1] | |
| 8e | 75% 66 | 1.7 | 25% 6I/6T [2] | |
| 8f | 75% 66 | 1.7 | 25% 6I/6T [3] | |
| 8g | 75% 66 | 1.7 | 25% poly(2 methylhexamethylene terephthalamide) | 0.48 |

[1] Random copolymer of 95% 6I and 5% 66, inherent viscosity 0.56.
[2] Random copolymer of 70% 6I and 30% 6T, i.e., hexamethylene terephthalamide, inherent viscosity 0.50.
[3] Random copolymer of 95% 6I, 5% 6T, inherent viscosity 0.5.

Filament and cord properties are reported in Table VI.

TABLE VI

| Sample | 8a | 8b | 8c | 8d | 8e | 8f | 8g |
|---|---|---|---|---|---|---|---|
| Tenacity (grams/denier) | 7.0 | | 4.6 | 5.8 | 4.0 | | |
| Elongation, percent | 12.0 | | 12.0 | 12.0 | 10.0 | | |
| Modulus (grams/denier) | 62 | | 79 | 60 | 70 | | |
| Set, percent | 1.07 | 0.78 | 0.64 | 0.98 | 0.92 | 0.88 | [1]1.70 |
| P.F.S. (mils) | 161 | 135 | 123 | 152 | 147 | 144 | 213 |

[1] On annealing at constant length for 3 hours at 230° C., this value is reduced to 1.00 and the P.F.S. is 154 mils.

Sample 8g is an example of partial isomorphicity. Although adequate flat-spotting performance would be predicted, from the composition equation at a B content as low as 15%, the A, B polymers of this blend tend to be isomorphous in the high temperature or hexagonal form due to the closeness in length of their respective repeat units. Thus, even at 25% B, the flat spot is about the same as for the A homopolymer alone but an annealing corrects the condition.

Similarly, the use of copolymer components in polyamide B which are individually isomorphous with the A component polymer is not as effective as expected. In a different 6I/6T copolymer B (e.g., 40/60), completely isomorphous mixtures with 66 are obtained, and a corresponding increase in tire flat spot is observed over that predicted from the set values for the A and B polyamides.

Example 9

Since polyamides A and B contain different structural units, they will usually have different solubilities in one or more of the common polyamide solvents. This difference in solubility may be used to identify the polymers of the fibers of the present invention and to confirm their block copolymeric nature. Thus a physical mixture of 66 and 6I can be almost completely separated by utilizing the solubility difference of these polyamides in formic acid-water mixtures, 66 being soluble in 76-78% formic acid and 6I in 96-98% formic acid. A random copolymer with less than 50% 6I is more soluble than either homopolymer. Block copolymers have intermediate solubilities, the exact behavior being determined by block size.

This example illustrates the utility of solubility in 82% formic acid as a criterion for estimating the degree of amide interchange, and hence the flat spotting tendency of the melt blended polyamide filaments of this invention. Polyamide filaments from 80% 66, 20% 6I are prepared, as described in Example 2a. The melt-blend temperature is 295° C. in each case. Varying holdup times are employed. The percent "set" is determined as well as the flat spot observed in 8.50 x 14 tires containing these cords. Observations are recorded in Table VII.

Each yarn is tested, according to the following procedure, in order to determine the fraction soluble in 82% formic acid. The results obtained show that solubility increases with an increase in the degree of amide interchange.

A 1 gram sample is dissolved in 10 ml. 98% formic acid and the solution mixed intimately with 75 g. of 320 mesh (standard sieve) sand. The resulting mixture is dried at 35° C. under vacuum to remove the formic acid solvent. The smple is then placed in a glass column and extracted (at room temperature) with 82% formic acid water. Extraction is continued until no further polymer is extracted. The amount of polymer extracted is determined by evaporation of the solvent.

Using amide-interchange rate constants derived from a study of model compounds, it has been deduced that the 6I component of the block copolymers produced by the desired minimum degree of interchange has an average length of about five 6I units. It is apparent that a greater degree of amide interchange is permissible when using high-viscosity (long chain) 6I polymers or when using high percentages (not over 50%) of the 6I additive. For the preferred composition, at least about 12% remains insoluble in 82% formic acid.

A more convenient and sensitive procedure for determining the degree of interchange is by a turbidimetric titration. According to this procedure, a 1 gram sample is completely dissolved in 50 ml. of 98% formic acid. Water is then slowly added until turbidity is visible. The The formic acid concentration at which the polymer first precipitates is calculated and the values are reported in Table VII. Reliable results are obtainable manually, observing the turbidity visually, if the water is added slowly. However, it is very convenient to use an automatic recording photometric titrator. Flat spots reported in Table VII are observed flat spots.

TABLE VII

| Sample | 9a | 9b | 9c | 9d | 9e |
|---|---|---|---|---|---|
| Holdup time, minutes | 4.7 | 7.1 | 13.6 | 21.2 | 30.0 |
| Flat spot, mils | 144 | 147 | 149 | 158 | 170 |
| Percent insoluble in 82% formic | 54 | 27 | 19 | 15 | 9 |
| First turbidity, percent formic acid | 86.7 | 85.0 | 80.4 | 78.6 | 77.0 |
| Estimated percent amide interchange | 0.8 | 1.2 | 3.5 | 5.5 | 10.8 |

Example 10

Following the procedure of Example 2a polyamide blends of 66 polyamide (A) and polyamide (B) identified in Table VIII having the compositions given in Table IX are prepared. Filaments are spun and drawn from each melt blend, corded and subjected to a laboratory flat spotting test, under the low relative humidity conditions (ca. 5% R.H.) previously specified. The test is then repeated at 40% R.H. in order to determine moisture sensitivity of the cord. In several instances, cords prepared under low humidity conditions are dipped, hot-stretched and used as reinforcements in tires made under dry conditions. In addition, for some cords, comparable tires are built and run in contact with a high speed test wheel for 20 hours in the presence of about 100 ml. water which was injected into the tires before testing. This allowed the cords to pick up about 1.8% of water. Standard flat spots were produced on all of these tires and observed. The difference between the dry and wet flat spots gives a measure of the moisture sensitivity of the filament in the tire and thus provides a guide for blend selection for tires which will be subject to manufacture and/or use in high humidity.

TABLE VIII

| Sample | Polyamide | ABB. |
|---|---|---|
| 10a | Bis(4-aminocyclohexyl)methane (70% trans-trans isomer) plus azelaic acid. | PACM-9 |
| 10b, c, d | Hexamethylene diamine plus 5-t butyl isophthalic acid. | 6-5-t-BuI |
| 10e | Hexamethylene diamine plus 76% 4,6-dimethylisophthalic acid, 24% 2,5-dimethylterephthalic acid. | |
| 10f, i | Hexamethylene diamine plus isophthalic acid | 6I |
| 10g | Bis(4-aminocyclohexyl)methane (55% trans-trans isomer) plus decamethylene-1,10-dicarboxylic acid. | PACM-12 |
| 10h | Bis(4-aminocyclohexyl)methane (55% trans-trans isomer) plus sebacic acid. | PACM-10 |

TABLE IX

| Sample | 10a | 10b | 10c | 10d | 10e | 10f | 10g | 10h | 10i | 10j |
|---|---|---|---|---|---|---|---|---|---|---|
| Ratio A/B | 80/20 | 80/20 | 85/15 | 75/25 | 80/20 | 80/20 | 80/20 | 80/20 | 95/5 | 90/10 |
| P.F.S.[1] (ca. 5% R.H.) | 135 | 128 | | 110 | 109 | 110 | 146 | 149 | | |
| P.F.S.[1] (ca. 40% R.H.) | 155 | 155 | | | 142 | 180 | 150 | 157 | | |
| Observed Flat Spot, dry | 126 | 129 | 135 | 119 | | 110 | | 130 | 143 | 128 |
| Observed Flat Spot, wet test | 135 | 148 | | | | 165 | | 150 | | 164 |

[1] Predicted flat spot based on unrelaxed cord.

Preferably the A and B polyamides are compatible in the melt. However incompatible combinations may be employed provided efficient mixing is employed to disperse polyamide B into the smallest possible aggregates. With some combinations, even with efficient mixing, a two-phase fiber with aggregates of 1,000 to 3,000 or more angstroms diameter will be observed under the electron microscope. Cords prepared from such melt blends will not have as good flat spotting performance as that expected from the set values, $S_A$ and $S_B$, of cords of the component polymers. This difficulty can be avoided by copolymerizing a small amount of another polyamide, preferably another B polyamide, with the incompatible B polyamide. This makes the A, B pair more readily dispersible, so that the final yarn will usually show aggregates less than 1000 angstroms in diameter. Using this technique, A, B polyamides may be combined to produce tire yarn having especial utility, as shown in the following example.

Example 11

An especially useful polyamide melt blend filament showing good flat spotting behavior dry or wet is one in which the A polyamide is 66 nylon and the B polyamide is a copolymer of 6-I/6-5-t-BuI; there are from 1.5 to 30% by weight 6I units. The lower composition limit (1.5% 6I units) is that amount required to reduce the size of the B polymer aggregates (Sample 11b); the upper limit is established to avoid excessive moisture sensitivity (Sample 11h).

Improvement to flat spotting by introduction of a copolymeric component into the stiff B polyamide is contrary to the general observation noted above that shortening the chain segment length of the stiff polymer B (by amide interchange, for example) generally makes flat-spotting worse.

Eighty parts of 66 nylon (A) flake of 65 relative viscosity (in 90% formic acid) are melt blended with twenty parts of flake of 6-I/5-t-BuI, i.e. the (B) polyamide. The A polyamide has a melting point of about 264° C. and a $T_g$ of about 80° C. The B polyamide has a relative viscosity of 15 in 98% formic acid, a $T_g$ of about 160° C. and a melting point in the range of 220–240° C. The blend is achieved by using two screw melters and a mechanical polymer mixer; the blend is immediately melt-spun to a 34-filament yarn. The yarn is drawn in two stages, using a 75° C. snubbing pin in the first stage and a hot pipe at about 200° C. in the second. The total draw ratio is 6×, of which 4× is in the first stage. The yarn thus produced is about 210 denier.

Polymer and yarn preparations are repeated with various B copolymer compositions, as shown in Table X. The ratio of A/B is held constant at 80/20. The different yarns are plied to 840 denier, corded, dried (about 5% R.H.), tested (without relaxation) for set values, and the predicted flat spots are calculated. In addition, similar data are determined at 40% R.H. The difference in predicted flat spots is a measure of the moisture sensitivity of the particular yarn.

In several instances, cords prepared under 40% relative humidity are dipped, hot-stretched and used as reinforcements in 2-ply tires, also made at 40% R.H. In addition, comparable tires are built and run in contact with a high speed test wheel for 20 hours in the presence of about 100 ml. water which was injected into the tire before testing. This allowed the cords to pick up about 1.8% of water. Standard flat spots were produced on all of these tires and observed. The difference between the dry and wet flat spots gives a measure of the moisture sensitivity of the filament in the tire.

TABLE X

| Sample | 11a | 11b | 11c | 11d | 11e | 11f | 11g | 11h | 11i |
|---|---|---|---|---|---|---|---|---|---|
| Composition of Copolymer B: | | | | | | | | | |
| 6-5-t-BuI, percent | 100 | 98.5 | 97 | 94 | 90 | 85 | 80 | 65 | 50 |
| 6-I, percent | 0 | 1.5 | 3 | 6 | 10 | 15 | 20 | 35 | 50 |
| Set | 0.78 | 0.68 | 0.69 | 0.68 | 0.68 | 0.69 | 0.69 | 0.69 | 0.69 |
| P.F.S. (mils): | | | | | | | | | |
| Dry (5% R.H.) | 135 | 127 | 128 | 127 | 127 | 128 | 128 | 128 | 128 |
| At 40% R.H. | 154 | 151 | 151 | 151 | 154 | 151 | 152 | 158 | 172 |
| Tire Flat Spot (2-ply tires): | | | | | | | | | |
| Dry | 130 | | 124 | 125 | 121 | | 120 | | 125 |
| Wet | 154 | | 149 | 145 | 149 | | 147 | | 183 |

It is noted that Samples 11b to 11g show a highly desirable flat spot performance under both wet and dry conditions. An appreciable increase in flat spot at 40% R.H. is observed for Sample 11h having 35% of the hexamethylene isophthalamide units. In other words, Samples 11b to 11i show a reduction in predicted flat spot performance under dry conditions but only Samples 11b to 11g exhibit that reduction as well as maximum freedom from the effect of moisture.

The procedure of this example is repeated using copolymer composition 11c as the B polyamide, and varying the ratio of A to B. The results obtained are listed in Table XI.

TABLE XI

| Sample | 11j | 11k | 11-l | 11m |
|---|---|---|---|---|
| Ratio, A/B | 85/15 | 80/20 | 75/25 | 60/40 |
| P.F.S.[1], dry | 135 | 126 | 114 | 106 |
| P.F.S.[1], 40% RH | 153 | 150 | 149 | 128 |
| Tire flat spot, dry | | 114 | 100 | 117 |
| Tire flat spot, wet | | 114 | 113 | 121 |

[1] On unrelaxed cord.

It is not known with certainty why introduction of the additional monomeric component in the B polymer decreases aggregate size; it may occur either by making polymers A, B more compatible or by lowering the melting point of B, thus preventing B from solidifying in large aggregates before solid A can form. The B polymers most likely to form large aggregates are those with the highest melting point and the stiffest structure. Larger amounts of the additional component will usually be required for such stiff B polymers. In general, however, only minor amounts of the copolymer component are required. Where the B polymer is of the diamine-dibasic acid type, it will usually be advantageous to introduce as a copolymer component either another diamine or another diacid, preferably having a stiff (ring) structure in its own right.

Example 12

The blend preparation procedure of Example 11 is repeated, using yarn spun from a melt blend of 80 parts 66 nylon as the A polyamide and 20 parts of a B polyamide from 1,4-bis(aminomethyl)-cyclohexane (HPXD) (40% cis, 60% trans isomers) and 5-t-BuI wherein a portion of the HPXD component is replaced with hexamethylene diamine forming the copolymer HPXD-5-t-BuI/6-5-t-BuI. The results are shown in Table XII. The yarns are spun and drawn in two stages as before, using a spinneret temperature of 292° C., a hot pin at 75° C., and a hot pipe at about 200° C. The draw ratio is 6× total, of which 3.5× is done in the first stage.

TABLE XII

| Sample | 12a | 12b |
|---|---|---|
| Composition of Copolymer B: | | |
| HPXD-5t BuI, Percent | 100 | 80 |
| 6-5t. BuI, Percent | 0 | 20 |
| Inherent viscosity of B | 0.3 | 0.2 |
| P.F.S., mils:[1] | | |
| Dry (5% R.H.) | 139 | 126 |
| At 40% R.H. | 155 | 142 |

[1] Based on unrelaxed cord.

It is noted that the blend yarn containing the copolymer has improved flat spot performance as compared to the homopolymer blend yarn.

Following the blend preparation procedure of Example 11, various polyamide melt blends are prepared, spun, drawn, and converted to cord. The predicted flat spot of each (unrelaxed) cord is measured and listed in Tables XIII, XIII(a) and XIII(b). In some cases, tires are made and are tested for flat-spotting. The intermediates for polymers and copolymers used as the B polyamide are listed in Table XIV. When copolymers are employed, the weight ratio of the repeating units in the copolymer is given. The polymers to be used in the melt blend are prepared by melt polymerization except in Examples 39 and 44 where the polymers are prepared by interfacial polymerization using the acid chloride. The viscosities reported are inherent viscosities except Examples 21, 22 and 34 unless otherwise indicated, which are relative viscosity as defined in U.S. Patent No. 2,385,890. The inherent viscosity of Example 20 is determined in 98% formic acid. In every example the A polymer is 66 nylon.

TABLE XIII

| | Polyamide B | | | | | | | | |
|---|---|---|---|---|---|---|---|---|---|
| Example | Diamine | Diacid | Copolymer Ratio | Viscosity | Polymer MP., ° C. | Wt. Ratio, A/B | Draw Ratio | P.F.S., 5% RH (mils) | P.F.S., 40% RH (mils) |
| 13 | d | l | | 0.48 | 175 | 80/20 | 6 | 116 | 184 |
| 14 | v | l | | 0.46 | 210 | 80/20 | 6 | 136 | 191 |
| 15 | c | e | | | 195 | 80/20 | | 149 | |
| 16 | c | f/g | 90/10 | | | 80/20 | | 113 | 172 |
| 17 | c | f/h | 90/10 | | | 80/20 | | 124 | 166 |
| 18 | i | j | | 0.93 | 278 | 80/20 | 6.3 | 150 | 172 |
| 19 | a | j | | 0.51 | 250 | 80/20 | 5 | 144 | |
| 20 | i | k/l | 95/5 | 0.84 | 273 | 80/20 | 6 | 171 | 173 |
| 21 | m | j/l | 80/20 | 93 | 265 | 80/20 | 5.8 | 148 | 152 |
| 22 | m | j/l | 70/30 | 90 | 250 | 80/20 | 5.8 | 144 | 150 |
| 23 | m | j/l | 50/50 | 0.26 | 250 | 80/20 | 5 | 153 | 160 |
| 24 | i | k/n | 95/5 | 0.78 | 285 | 80/20 | 6 | 143 | 147 |
| 25 | i | k/n | 90/10 | 0.46 | 220 | 80/20 | 6 | 154 | |
| 26 | i | k/n | 70/30 | 0.61 | 270 | 80/20 | | 139 | 141 |
| 27 | o | n | | 0.72 | 295 | 80/20 | 6 | 133 | 158 |
| 28 | m | n/l | 60/40 | 0.31 | 252 | 80/20 | 6 | 161 | 166 |
| 29 | m | n/l | 50/50 | 0.41 | 260 | 80/20 | 6 | 153 | 162 |

TABLE XIII (A)

| | Polyamide B | | | | | | | | |
|---|---|---|---|---|---|---|---|---|---|
| Example | Diamine | Diacid | Copolymer Ratio | Viscosity | Polymer MP., ° C. | Wt. Ratio, A/B | Draw Ratio | P.F.S., 5% RH (mils) | P.F.S., 40% RH (mils) |
| 30 | m | n/f | 70/30 | 0.33 | 210 | 80/20 | 6 | 141 | 151 |
| 31 | m | n/f | 60/40 | 0.36 | 250 | 80/20 | 6 | 142 | 157 |
| 32 | m/c | n/l | 80/20 | 0.30 | 248 | 80/20 | 5 | 154 | 163 |
| 33 | i/c | n/l | 80/20 | 0.33 | 229 | 80/20 | 5 | 153 | 158 |
| 34 | i/c | n | 60/40 | 12.8 | 290 | 80/20 | 5.7 | 145 | 178 |
| 35 | i | k/g | 99/1 | 0.7 | 280 | 80/20 | 6 | 153 | 154 |
| 36 | p | l | | 0.23 | 235 | 90/10 | 6 | 137 | 173 |
| 37 | p/c | l | 70/30 | 0.36 | 215 | 90/10 | 6 | 138 | 182 |
| 38 | p | f | | 0.17 | 230 | 90/10 | 6 | 138 | 162 |
| 39 | q | r | | 0.46 | 215 | 80/20 | 5.3 | 146 | 168 |
| 40 | x | l | | 0.64 | 215 | 80/20 | 6 | 170 | 192 |
| 41 | t | f/l | 80/20 | 0.21 | 230 | 90/10 | | 131 | 142 |
| 42 | s/c | l | 70/30 | 0.51 | 225 | 90/10 | 6 | 169 | 177 |
| 43 | s/c | f/l | 70/30 | 0.28 | 250 | 90/10 | 6 | 146 | 151 |
| 43 | u | g | | | | 80/20 | | 145 | 147 |

TABLE XIII (b)

| Example | 45 |
|---|---|
| Polyamide B: | |
| Diamine | w |
| Diacid | 1 |
| Copolymer Ratio | |
| Viscosity | 0.35 |
| Polymer MP, °C | 205 |
| Wt. Ratio, A/B | 80/20 |
| Draw Ratio | 6 |
| P.F.S., 5% RH (mils) | 117 |
| P.F.S., 40% RH | 147 |

TABLE XIV a  dimethyl-m-phenylene diamine, mixture of 2,4 and 4,6 isomers
b  suberic acid
c  hexamethylene diamine
d  octamethylene diamine
e  bis(p-carboxyphenyl)propane
f  5-t-butylisophthalic acid
g  terephthalic acid
h  bibenzoic acid
i  bis(4-aminocyclohexyl)methane, 70% trans-trans isomer
j  1,12 dodecane dioic acid
k  azelaic acid
l  isophthalic acid
m  bis(4 - aminocyclohexyl)methane, 55% trans-trans isomer
n  adipic acid
o  bis(4-aminocyclohexyl)methane, 12.1% trans-trans isomer
p  m-xylylene diamine
q  2-methylhexamethylene diamine
r  1,2-dicarboxycyclopropane
s  1,4-bis(aminomethyl)cyclohexane
t  p-xylylene diamine (pXD)
u  3,3'-aminopropyl ether
v  decamethylene diamine
w  2,2,5,5-tetramethylhexamethylene diamine
x  dodecamethylene diamine The observed flat spots (measured on 2 ply tires) in Examples 29, 30 and 31 are 130, 143 and 132 mils respectively. The flat spots observed on Example 43 are 133 mils dry and 155 mils wet.

Example 46

An especially useful B polyamide for melt blending with A polyamides such as 66 nylon is prepared by the melt polymerization of 1,4-bis(aminomethyl)cyclohexane and isophthalic acid (HPXD–I. The thus-prepared B polyamide of 0.42 inherent viscosity, 240° C. melting point, is melt blended with 66 nylon in the proportions shown in Table XV. Yarn is spun and drawn 6×, and cords are prepared and tested as described in Example 11, with the results listed in the table.

TABLE XV

| Example | 46a | 46b | 46c |
|---|---|---|---|
| Ratio, Polyamide A/B | 90/10 | 85/15 | 80/20 |
| Yarn Properties: | | | |
| Tenacity, g.p.d | 8.9 | 8.4 | |
| Elongation, percent | 16 | 15 | |
| Initial Modulus, g.p.d | 54 | 56 | |
| Flat Spot Mils (2-ply tires): | | | |
| Predicted, 5% RH | 137 | 130 | 120 |
| Predicted, 40% RH | 181 | 158 | 147 |
| Observed, Dry | 116 | 113 | |
| Observed, Wet Test | 150 | | |

Example 47

The B component of the melt blend may itself be a melt blend of two or more high $T_g$ polyamides or copolyamides, as shown in this example.

Cords are prepared from melt blends 80% by weight of which is 66 nylon (A). The B component is a blend of 3 parts of $B_1$ to 1 part of $B_2$ of the polymers listed in Table XVI. The polymerization, blending, spinning and drawing techniques of Example 11 are used. Each yarn is drawn 6× its extruded length. The predicted flat spot is determined on cords from each melt blend, with the results listed in the table.

TABLE XVI

| Example | 47a | 47b |
|---|---|---|
| Polyamide A | 66 | |
| Polyamide $B_1$ | 6-5-t-BuI/6-I (97/3) | 6-5-t-BuI/6-I (97/3). |
| Polyamide $B_2$ | HPXD-5-t-BuI/6-5-t-BuI (90/10).[1] | pXD-5-t-BuI/pXD-I (90/10).[1] |
| Yarn tenacity, g.p.d | 5.3 | 5.0. |
| Yarn elongation, percent | 13.5 | 17. |
| Yarn modulus, g.p.d | 55 | 62. |
| P.F.S., dry | 126 | 132. |
| P.F.S., 40 percent RH | 142 | 151. |

[1] Ratio of copolymeric constituents.

Suitable A polyamides consist essentially of a repeating unit from the class consisting of and wherein D is a divalent aliphatic group, and E is a member of the class consisting of a divalent aliphatic and aromatic group.

Polyamide A may, for example, be any one of the following: polytetramethylene suberamide; polyhexamethylene suberamide; polyhexamethylene adipamide; polyhexamethylene sebacamide; poly-ε-caproamide; poly-n - heptylamide; poly-caprylamide; polypelargonamide; polydecanoamide; polytridecanoamide; polyundecanoamide; polymetaxylylene adipamide; polymetaxylylene pimelamide; polymetaxylylene suberamide; polymetaxylylene azelamide; polymetaxylylene sebacamide; polytridecamethylene tridecanoamide. It may be a homopolymer, a random or block copolymer, or a polymer blend. Such polymers should have a melting point of at least 180° C. for practical operation as the reinforcement cords.

Polymetaxylylene adipamide is somewhat different from the other members of the A group, for although it has a $T_g$ less than about 120° C., it has a set value of about 1.00%. Thus, it may be employed, as a homofiber, to make a tire of borderline acceptability with respect to flat spotting at high operating speeds. However, when melt blended in accord with the process of this invention, flat-spotting performance is improved.

Suitable B polyamides consist essentially of a repeating unit of the formula wherein G and I are members of the class consisting of divalent aliphatic, aromatic and cycloaliphatic groups, by which is meant that the carbonamide linkages of the polyamide are directly attached to aliphatic, aromatic or cycloaliphatic carbon atoms respectively, with the provisos that (1) when either member of the class consisting of G and I is an aliphatic group, the other member is a carbocyclic group with the carbonamide linkages attached directly to ring carbon and (2) sufficient units of G and I are from the class consisting of an aromatic and cycloaliphatic group to provide a polymer with a $T_g$ of at least about 140° C. and a block melting point less than about 350° C. Preferably, when either G or I is an aromatic and monocyclic group, e.g., phenylene, the carbonamide linkages are meta oriented.

Polyamide B may, for example, be any one of the polymers prepared from: metaphenylenediamine and adipic acid, pimelic acid or suberic acid; 1,3-diaminocyclohexane (mixed isomers) and adipic acid; paraphenylenediamine and azelaic acid or sebacic acid; bis(4-aminocyclohexyl)-methane (liquid isomer mixture, e.g., 80% cis, trans; 20% cis, cis) and oxalic acid or isophthalic acid; bis(4-amino-cyclohexyl)-methane (solid isomer mixture, e.g., 50–75% trans, trans; 45–25% cis, trans) and azelaic acid, sebacic acid or deca-methylene-1,10-dicarboxylic acid; bis(4-aminophenyl) methane methane and adipic acid; 4,6-dimethyl metaphenylenediamine and suberic acid, azelaic acid or sebacic acid; 2,4-dimethyl metaphenylenediamine and 4,6-dimethyl metaphenylenediamine (e.g., 50/50) plus suberic, azelaic, or sebacic acid; 1,3-diaminopropane and isophthalic acid; 1,4-diaminobutane and isophthalic acid; 1,5-diaminopentane and isophthalic acid; 1,6-diaminohexane and isophthalic acid; 2-methyl hexamethylenediamine and terephthalic acid; metaxylylenediamine and isophthalic acid; hexamethylene diamine and 5-t-butyl isophthalic acid, 4,6-dimethyl isophthalic acid, or 2,5-dimethyl terephthalic acid; or 1,4-bis(aminomethyl)cyclohexane (mixed isomers) and adipic acid or isophthalic acid. It may be a homopolymer, a random or block copolymer, or a polymer blend.

In general, the melt blends of the instant invention, as well as the filaments spun therefrom, will contain from about 5 to about 80, and preferably from about 12 to about 50 parts of B, and from about 95 to 20 (preferably at least 50) parts of A.

A further requirement is that the blend of polyamides A, B be of fiber-forming molecular weight (e.g., above 10,000) although the individual components need not always be in the fiber-forming range. At a given concentration of B, it has been found that low molecular weight may sometimes give a lower tire flat-spot than higher molecular weight. However, yarns containing the very low molecular weight B are usually deficient in tenacity, fatigue, etc. It is of course, essential that the molecular weight of B should substantially exceed the average segment length found in a random copolymer of A and B since a blend containing such very low molecular weight B polyamide would have properties corresponding to those of the random copolymer.

Generally, maximum operable molecular weight for each component will provide the best fiber properties. When both polyamides are of fiber-forming molecular weight, cords of each are easily produced, thus facilitating determination of the homopolymer cord set values, $S_A$ and $S_B$. These values may be used to define the preferred composition limits, as described previously.

The mixture of A and B polymer melts is heated and stirred to obtain a homogeneous melt blend. The time during which the blend is held at the melt should be kept to a minimum so that there will be minimum amide interchange between polymers A and B, thus maintaining maximum block length for each homopolymer. These conditions are attained if the molten blend is held at a temperature at least 1° C. above the melting point of the mixture but not above 350° C. for the minimum time possible, and in any event, not over 120 (1/2) T−250/30 minutes. Preferably, the hold temperature is from 5–50° C. above the melting point of the blend and the period of time involved is not over 60 (1/2) (T−250)/30 minutes. In the latter expressions, T is the symbol for the hold temperature in ° C. The above upper limit expression applies to polyamides of normal fiber-forming molecular weight. The presence of acid ends or water catalyzes amide interchange so that hold time must be further restricted when abnormal amounts of such reactants are present.

Efficient mixing of polymers A and B is required to obtain the desired yarn properties. The mixing may be accomplished in any suitable operation such as by mixing flakes, melts, or solutions, with the mixing of flakes or melts being preferred. The melt blended product may be converted into yarn by wet, dry or melt spinning, with the latter being the preferred route. In some cases, the duration of the treatment or temperature required can be decreased by treatment with a plasticizer such as steam or a swelling agent, as long as such plasticizer is not present in the cord when it is incorporated into a tire.

With some of the melt-blended yarns of this invention, moisture in the cord when in a tire can have a reversible, undesirable effect. There are several ways by which this effect can be minimized. Tires are preferably built under low humidity (20% R.H.) conditions, using dry rubber stocks. Ovens used for hot stretching cords are preferably supplied with dry air. When these precautions have not been observed, the expected flat-spotting improvement may not be obtained until the tire has been run long enough to drive off the moisture or heated in an oven.

Decreased moisture sensitivity of the melt-blended polyamide filaments may be obtained by selecting B polyamides which have alkyl substituents on the aromatic rings (examples are the polyamides from hexamethylene diamine and 5-t-butyl isophthalic acid, 4,6-dimethyl isophthalic acid or 2,5-dimethyl terephthalic acid and from 4,6-dimethyl-m-phenylene diamine and suberic acid); and/or those polyamides which have a high hydrocarbon content or a low amide content, such as the polyamide from bis-(4-aminocyclohexyl)methane and azelaic, sebacic or decamethylene 1,10-dicarboxylic acid.

The polyamide filaments of this invention are not only useful in the production of tire cords of exceptional thermal stability, but they are also useful as reinforcements for fire hoses, belts, mechanical rubber products and as industrial yarns in general, as well as in textile yarns because of their exceptionally high modulus. Such yarns, in the form of filaments, tow, staple or the like, find utility in carpets, pile fabrics, twills, taffeta, and woven and knitted fabrics generally.

The melt blended polymers of this invention may contain the usual additives for polyamides, including delusterants as disclosed in U.S. Patent No. 2,205,722, antioxidants such as those disclosed in U.S. Patent No. 2,510,777 or light stabilizers such as those disclosed in U.S. Patent No. 2,887,462.

It is apparent that many combinations of the disclosed polyamides A, B other than those which have been exemplified may be melt blended in the manner and for the purposes described herein without departing from the spirit of the present invention which is accordingly intended to be limited only by the scope of the appended claims.

I claim:

1. A filament of at least two melt-blended, non-isomorphous, polyamides, said melt-blend having a molecular weight above 10,000, at least one of said polyamides, (A), having a glass transition temperature ($T_g$) of no more than about 120° C. and a melting point between 180° C. and 350° C., and consisting essentially of repeating units from the class of and wherein D is a divalent aliphatic group, E is a member of the class consisting of divalent aliphatic and aromatic groups, and at least one other of said polyamides, (B), having a ($T_g$) of at least about 140° C., a melting point between 180° C. and 350° C., and constituting from about 5 to about 80% by weight of the polymer blend, and consisting essentially of repeating units of the formula:

wherein G and I are members of the class consisting of divalent aliphatic, aromatic and cycloaliphatic groups, with the proviso that when either member of the class consisting of G and I is an aliphatic group, the other member is a carbocyclic group with ring carbon attached directly to the carbonamide group, with not more than 10% of B having amide interchanged with A in the blend constituting the filament.

2. A filament of melt-blended polyamides, one of which is polyhexamethylene adipamide and another being polyhexamethylene isophthalamide, said melt-blend being of molecular weight above 10,000, said polyhexamethylene isophthalamide being present in an amount of between 5 and 80% by weight of the blend with not more than 10% having amide interchanged with the polyhexamethylene adipamide.

3. A filament of melt-blended polyamides, one of which is polyhexamethylene adipamide and another being a copolymer of hexamethylene isophthalamide and hexamethylene - 5 - tertiary-butyl-isophthalamide, said melt-blend being of molecular weight above 10,000, said copolymer constituting between 5 and 80% of the blend with not more than 10% having amide interchanged with the polyhexamethylene adipamide.

4. The filament of claim 1 wherein G is an arylene group.

5. The filament of claim 1 wherein I is an arylene group.

References Cited

UNITED STATES PATENTS 3,195,603  7/1965  Ahles _____________ 260—859

OTHER REFERENCES

On Heterochain Polyamides XVIII Formation of Mixed Polyamides During Melting of Homochain Compounds; T. M. Frunze, V. V. Korshak, and V. A. Makarkin; High Molecular Weight Compounds (U.S.S.R.) 1, 500–505 (1959) No. 4 April.

MURRAY TILLMAN, *Primary Examiner.*

P. LIEBERMAN, *Assistant Examiner.*

UNITED STATES PATENT OFFICE
CERTIFICATE OF CORRECTION

Patent No. 3,393,252                                   July 16, 1968

Joseph Zimmerman

It is certified that error appears in the above identified patent and that said Letters Patent are hereby corrected as shown below:

Column 3, lines 72 to 74, that portion of the formula reading "$24S_B$" should read -- $24S_B^2$ --. Column 4, line 15, "1.0%" should read -- 1.07% --. Column 5, line 51, "maintains" should read -- maintain --. Column 6, line 17, "sports" should read -- spots --. Column 8, TABLE III, in the heading, line 1 thereof, "80/30" should read -- 80/20 --; same table, second column, line 2 thereof, "15" should read -- 13 --; same table, third column, line 5 thereof, "1.06" should read -- 1.04 --. Column 9, line 7, "0.70%" should read -- 0.79% --. Column 10, line 58, cancel "The". Column 15, line 51, "(HPXD-I" should read -- (HPXD-I) --. Column 17, line 6, cancel "methane", second occurrence.

Signed and sealed this 23rd day of December 1969.

(SEAL)
Attest:

EDWARD M. FLETCHER, JR.                           WILLIAM E. SCHUYLER, JR.
Attesting Officer                                      Commissioner of Patents